United States Patent [19]

Lindner

[11] Patent Number: 5,123,569
[45] Date of Patent: Jun. 23, 1992

[54] DEVICE FOR MELTING AND INJECTING WAX FOR THE MANUFACTURE OF WAX PARTS IN BROKEN-MOULD CASTING

[76] Inventor: Arno Lindner, Diefenbachstrasse 13, D-8000 München 71, Fed. Rep. of Germany

[21] Appl. No.: 651,084

[22] Filed: Feb. 6, 1991

[30] Foreign Application Priority Data

Jul. 18, 1990 [DE] Fed. Rep. of Germany ....... 4022862

[51] Int. Cl.$^5$ .................................................... B67D 5/62
[52] U.S. Cl. ............................................. 222/56; 219/421; 222/64; 222/146.5; 222/394; 264/176.1; 425/378.1
[58] Field of Search .................. 222/56, 64, 67, 146.2, 222/146.5, 394, 396, 397, 129, 135, 136; 264/176.1; 425/378.1; 219/420, 421, 423, 424, 425, 450

[56] References Cited

U.S. PATENT DOCUMENTS

| | | | |
|---|---|---|---|
| 2,278,875 | 4/1942 | Graves | 264/176.1 |
| 2,408,221 | 9/1946 | Michel | 222/56 |
| 2,437,685 | 3/1948 | Dreyfus | 264/176.1 X |
| 2,542,239 | 2/1951 | Engels et al. | 222/64 |
| 2,544,661 | 3/1951 | Fossa | 222/146.5 |
| 2,683,073 | 7/1954 | Pierce | 219/421 X |
| 2,809,772 | 10/1957 | Weisz | 219/421 X |
| 3,326,415 | 6/1967 | Estabrooks | 219/421 X |
| 3,528,587 | 9/1970 | Popinski | 222/56 |
| 3,600,486 | 8/1971 | Walker et al. | 264/176.1 X |
| 3,638,673 | 2/1972 | Stanciu | 425/203 X |
| 3,917,122 | 11/1975 | Swan, Jr. et al. | 222/146.5 |
| 4,303,108 | 12/1981 | Akers et al. | 222/146.5 X |
| 4,378,897 | 4/1983 | Kattelmann | 222/56 |
| 4,442,070 | 4/1984 | Proksa et al. | 425/543 X |
| 4,499,367 | 2/1985 | Schwob | 222/146.5 X |
| 4,544,084 | 10/1985 | Cleland | 222/56 |
| 4,811,863 | 3/1989 | Claassen | 222/146.5 |

FOREIGN PATENT DOCUMENTS

1131365 6/1962 Fed. Rep. of Germany .

*Primary Examiner*—Kevin P. Shaver
*Attorney, Agent, or Firm*—Nikaido, Marmelstein, Murray & Oram

[57] ABSTRACT

The invention relates to a device (1) for melting and injecting wax for the manufacture of wax parts in broken-mould casting. The device (1) comprises a wax boiler (2) having a wax-injection nozzle. The boiler being provided with a heating device (3) for melting the wax and keeping it molten. The wax boiler (2) is pressure-sealed with a removable lid (5) and has a pressure inlet connected to a pressure source (33). Furthermore, a deaeration valve (13) is provided on the lid. The wax boiler (2) is connected via a wax-replenishing channel (15) to a wax-premelting container and wax reservoir (14) containing a heating device (16). A shut-off valve (17) is provided in the wax-replenishing channel (15).

15 Claims, 2 Drawing Sheets

DEVICE FOR MELTING AND INJECTING WAX FOR THE MANUFACTURE OF WAX PARTS IN BROKEN-MOULD CASTING

SUMMARY OF THE INVENTION

The invention relates to a device for melting and injecting wax for the manufacture of wax parts in broken-mould casting, comprising a wax boiler having a wax-injection nozzle, said boiler being provided with a heating device for melting the wax and keeping it molten, and having a removable lid to pressure-seal said boiler and a pressure inlet connected to a pressure source, said lid being provided with a deaeration valve.

Broken-mould casting, which is also known as investment or lost-wax casting, is in principle a very ancient process. In the last few decades, this process has reached a very high degree of technological perfection, so that it has become an important branch of operations in its own right. Today, many millions of parts are manufactured according to this process which would be difficult or even impossible to manufacture more easily, better, more accurately and more cheaply in any other way. In the main, the parts involved are those which, on the one hand, need to have a completely smooth surface, and which, on the other hand, should not need any further processing after casting, thanks to the detail of their design. The principle of the process consists in first of all producing a master pattern, and then shaping it in a female mould, from which in turn patterns are cast in wax, which are used to manufacture casting moulds made of a super-refractory material. The wax patterns are melted out of these moulds in order to obtain the cavity which receives the metal for the final product. This means that for each casting it is necessary to manufacture a separate wax part as the pattern, which melts in the course of the process and is thus lost. The manufacture of these wax parts therefore takes up a major part of the working process, and has a decisive influence on the cost. For injecting the wax into the female moulds, devices of the type defined at the beginning are used, the quality of the final castings and the profitability of the entire process depending above all on the quality of the wax parts manufactured, since the castings can never be better than the wax parts from which they are cast.

Known devices for melting and injecting the wax have a wax boiler to feed the wax-injection nozzle, in which the wax is melted and kept molten by means of a heating device. The wax boiler containing the molten wax usually ranges in volume between approx. 0.5 and 5 1, and is usually pressure-sealed with a lid, compressed air being admitted to provide the spraying pressure for the wax-injection nozzle, the inlet for which is at the bottom of the wax boiler, i.e. the inlet is beneath the surface level of the wax. In known devices of this kind, a contrivance has been found to check the amount of wax contained in the wax boiler, in that the lid or the wax boiler itself has been manufactured from a transparent material, such as plexiglass, for example, because if the wax level sinks below the inlet of the wax-injection nozzle, this will lead to interruptions in production. Interruptions of this kind are particularly serious, because with a volume of approx. 5 1, it takes at least three hours to melt a new supply of wax. In known devices, it is on the one hand difficult, because of the unavoidable soiling of the transparent material, to keep a close check on the wax level inside the wax boiler, and on the other hand, it is necessary to prepare a correspondingly large quantity of molten wax with which to replenish the wax charge. In practice, a solution has so far been found in providing a second heated container in order to have available a supply of molten wax, thus making it possible to avoid interruptions in production.

Proceeding from this state of the art, the object of the present invention is to improve the device of the type described initially in such a way that with very simple means it is possible to avoid interruptions in the manufacture of wax parts.

This task is solved according to the invention by having the wax boiler connected via a wax-replenishing channel to a wax-premelting container and wax reservoir containing a heating device, and by having a shut-off valve provided in the wax-replenishing channel. By means of the invention, the advantage achieved is that in this way, a supply of wax is present and available for replenishing at any time in an extremely compact and simple design, so that there is no longer any risk of production losses, since, in order to replenish the supply of wax in the wax boiler itself, i.e. for the continuous manufacture of wax parts, it is merely necessary to operate the shut-off valve. In the process, the dimensions can be selected in such a way that the wax reservoir, which in practice constitutes a wax-premelting pot, is of the same volume as the wax boiler itself.

In detail, a further embodiment of the invention can be obtained by having the heating device of the wax reservoir formed as electric heating lagging and having an adjustable thermostat provided for the heating lagging. One result of this arrangement is that the additional wax supply is likewise kept permanently at the ideal operating temperature, so that if for any reason the wax boiler should be emptied completely, it is possible to continue work without any down-time whatsoever. It is particularly important for the quality of the wax parts produced that the temperature of the wax in the boiler should be maintained precisely, since the wax becomes too viscous at too low a temperature, which means that the mould is not filled completely, and because the wax becomes too liquid at too high a temperature, which leads to contraction cavities in the parts, and also to ridges, thus making touching-up work necessary.

A preferred embodiment of the invention provides for the wax reservoir to be disposed within a housing having heat insulation. This produces a saving in the amount of electric energy needed to melt and keep warm the wax in the wax reservoir.

The wax reservoir is preferably sealed with a removable lid, which simplifies the task of replenishing the wax reservoir.

In detail, it is preferable for the wax reservoir to be disposed above the wax boiler.

It is especially advantageous in this context for there to be an outlet from the wax-replenishing channel leading into the wax boiler and disposed in the lid of the wax boiler.

In a preferred embodiment, the wax-replenishing channel is formed in a pipe socket, which supports the wax reservoir at a distance above the lid of the wax boiler in such a way that the wax is transported from the wax reservoir to the wax boiler under the force of gravity. By means of these features, the design of the device according to the invention is simplified considerably.

In a preferred embodiment, the pipe socket should likewise have heat insulation, which improves the possibility of maintaining the optimum temperature.

In order to prevent residue from forming in the wax reservoir in the long term, it is especially preferred for the pipe socket to lead out of a funnel-shaped depression in the bottom of the wax boiler.

A particularly preferred embodiment of the invention is obtained by having the wax reservoir formed as a unit that can be mounted on the wax boiler, with the pipe socket firmly connected to the lid of the wax boiler and forming the support of the wax reservoir. This embodiment is particularly suitable for retrofitting existing wax boilers by replacing the original lid with the unit consisting of the lid supporting the wax reservoir above the pipe socket.

With embodiments which are not intended for retrofitting existing wax boilers, it is advantageous to dispose the wax boiler and the wax reservoir in a common housing.

In a modified embodiment of the invention, it is provided for the lid of the wax reservoir to be formed as a pressure-tight lid and for the wax reservoir to have an inlet connected to a pressure source, the pressure at the inlet being greater than the pressure in the wax boiler. With this embodiment, it is therefore not necessary to dispose the wax reservoir above the wax boiler, because instead of the wax being transported from the wax reservoir to the wax boiler under the force of gravity, it is transported by the difference in the pressure present in the two containers. Furthermore, it is not necessary, as in the first embodiment, first to deaerate the wax boiler in order to relieve the pressure existing therein before the wax can be replenished. Instead, the existing difference in pressure makes replenishing possible by simply opening the shut-off valve.

In detail, this embodiment can be further developed by having the wax reservoir and the wax boiler connected to a common pressure source and by having regulating devices provided in the pressure line leading to the wax boiler, for adjusting the difference in pressure between the wax reservoir and the wax boiler. In this way, the pressure source which is provided in any case to generate the injection pressure can simultaneously be used for generating the transport pressure.

In a further development according to the invention, it is in addition provided that a level sensor should be provided in the wax boiler to detect the level of the wax, and that said level sensor should control the shut-off valve. In this way, it is possible to control the amount of wax contained in the wax boiler automatically.

This can preferably be achieved by having limit switches provided, corresponding to the minimum and maximum levels and connected so as to act together with the level sensor, which control an operating element of the shut-off valve.

In the following, the invention will now be described in greater detail by means of embodiments depicted in the drawings by way of example.

DESCRIPTION OF THE PREFERRED EMBODIMENTS

Reference will first be made to the embodiment according to FIG. 1.

Figure 1:
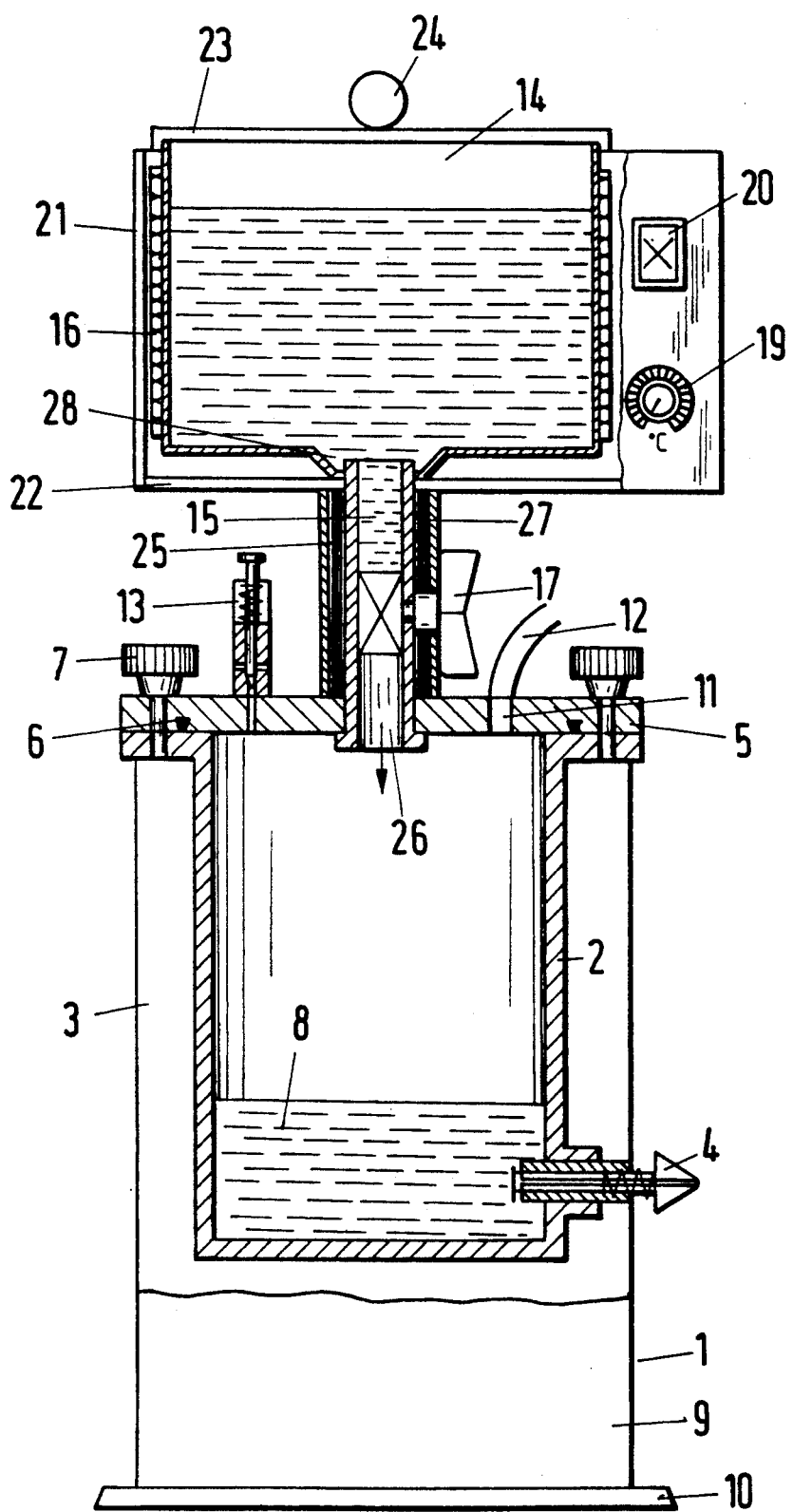
FIG. 1 shows a schematic lateral sectional view of a first embodiment according to the invention.

As is shown in the schematic presentation according to FIG. 1, a device 1 for melting and injecting wax into female moulds used in broken-mould casting for manufacturing wax parts from a wax boiler 2 having near the bottom a wax-injection nozzle 4 projecting laterally. The wax boiler 2 is provided with a heating device 3 for melting the wax and keeping it molten, the elements for controlling the temperature of the boiler and the corresponding display and switching elements not being shown in the drawing, since these are also provided in standard wax boilers.

The wax boiler 2 is pressure-sealed by a lid 5, gaskets 6 and locks 7 being provided to seal the interior of the wax boiler 2, so that the pressure present in the interior of the boiler 2 is applied to the surface of the molten wax 8 located therein.

The wax boiler 2 with its heating device 3 is contained in a housing 9 provided with a floor plate 10 on which the entire device stands.

A pressure inlet 11 is provided in the lid 5 of the wax boiler 2, which is connected via a pressure line 12 to a pressure source not shown in FIG. 1. Said pressure source will usually consist of compressed air, so that compressed air can be admitted to the interior of the wax boiler 2 above the surface of the molten wax 8.

In addition, a deaeration valve 13 is fitted to the lid 5, via which the pressure can be released from the wax boiler 2. This is necessary either to open the wax boiler 2 or, in the case of the first embodiment of the invention, to replenish the wax.

The wax-injection nozzle 4 projects laterally from the housing 9, so that via the wax-injection nozzle 4 a female mould connected thereto can be filled with liquid wax by pressing in the wax-injection nozzle under pressure.

As shown in FIG. 1, a wax reservoir 14 is provided above the wax boiler 2 in a first embodiment according to the invention. Said wax reservoir serves as a premelting and storage unit from which the molten wax contained in the wax boiler 2 can be replenished.

The wax reservoir 14 is connected to the wax boiler 2 via a wax-replenishing channel 15, and in this embodiment a manually operated shut-off valve 17 is provided in the wax-replenishing channel 15.

The wax reservoir 14 itself contains a heating device 16, which is preferably formed as electric heating lagging 18.

As shown, a thermostat 19 is provided for the heating lagging 18 in order to adjust the temperature of the molten wax in the wax reservoir 14. In this case, a mains switch 20 is also shown, with which the entire apparatus can be started.

The wax reservoir 14 with the heating lagging 18 is contained in a housing 21, the thermostat 19 and the mains switch 20 being located on the exterior of the housing.

As shown, the housing 21 is provided with heat insulation 22 and sealed with a detachable lid 23, which can be removed from the wax reservoir 14 and replaced thereon by means of a handle 24.

As FIG. 1 shows, the wax reservoir 14 is disposed at a distance above the wax boiler 2. The outlet 26 of the wax-replenishing channel 15 leading into the wax boiler 2 is formed in the lid 5 of the wax boiler 2, the wax-replenishing channel 15 being disposed inside a pipe socket 25 connecting one of the wax reservoir 14 to the wax boiler 2.

The pipe socket 25 supports the wax reservoir 14 at a distance above the lid 5 of the wax boiler, so that the molten wax is transported from the wax reservoir 14 to the wax boiler 2 under the force of gravity when the shut-off valve 17 is opened and the pressure present in the wax boiler 2 has previously been released via the deaeration valve 13.

The pipe socket 25 is likewise provided with heat insulation 27 and surrounded by a housing in order to ensure that when the wax boiler 2 is replenished, the wax cannot cool down at this point.

The pipe socket 25 leads out of a funnel-shaped depression 28 in the bottom of the wax reservoir 14, so that the latter can be emptied completely. After being emptied completely, the wax reservoir 14 can be replenished with fresh wax, without interrupting production, the wax then being melted there and kept in a molten state at the necessary temperature.

In the embodiment in accordance with FIG. 1, the wax reservoir 14 is formed as a unit which can be mounted on existing wax boilers 2 for retrofitting. For this purpose, the wax reservoir 14 is firmly connected via the pipe socket 25 to the lid 5 of the wax boiler 2, so that the lid 5 and the pipe socket 25 form the support of the wax reservoir 14, including the housing 21.

Deviating from the drawing as per FIG. 1, it is of course also possible to dispose the wax boiler 2 and the wax reservoir 14 in a common housing if the main purpose is not to retrofit existing wax boilers.

Figure 2:
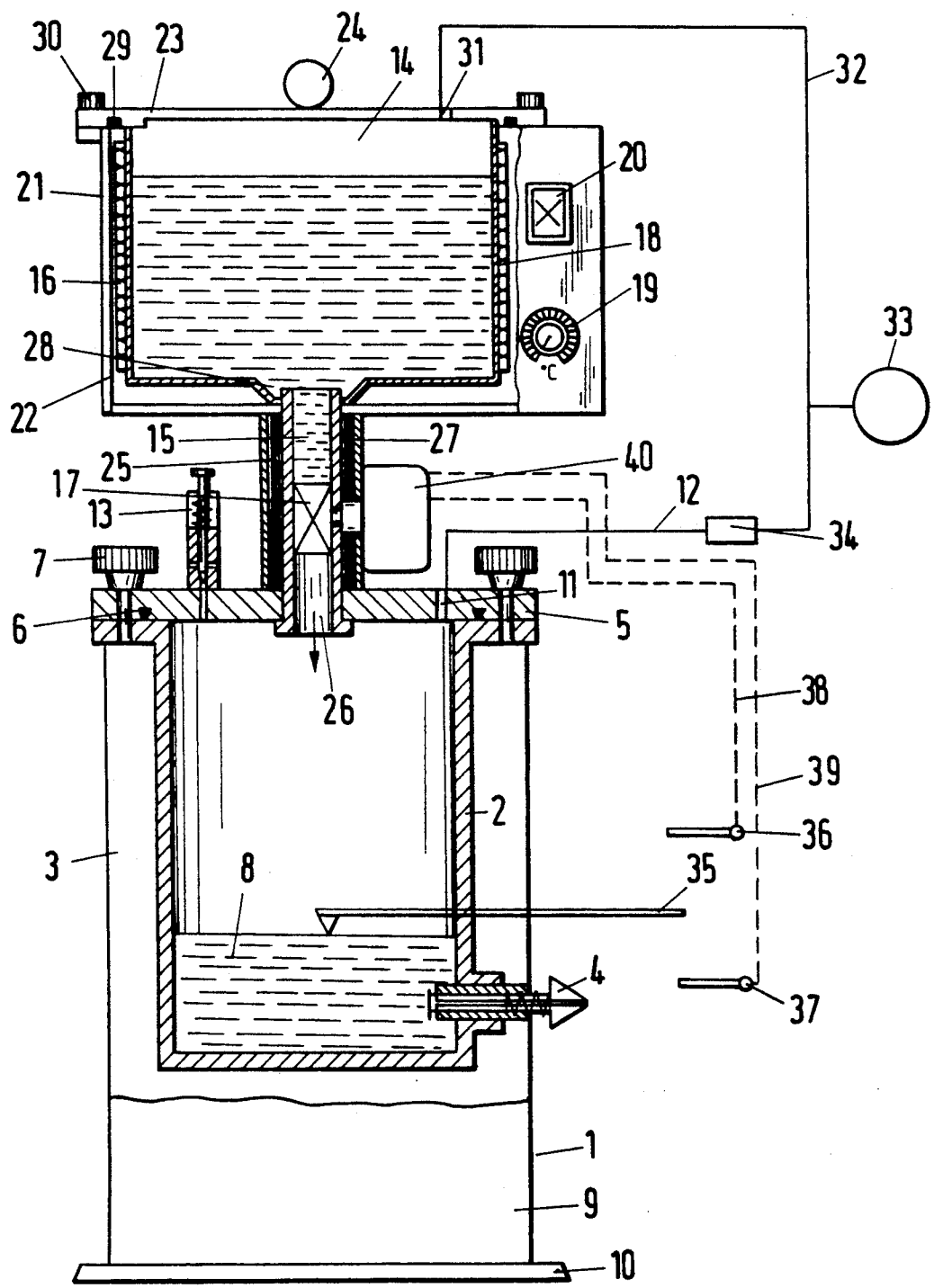
FIG. 2 shows a sectional view corresponding to FIG. 1 of a second embodiment according to the invention.

In the embodiment in accordance with FIG. 2, in which the reference numbers refer to the same parts as in FIG. 1, or to parts achieving the same effect, so that it is possible to refer in this connection to the above description, provision has been made for automatically replenishing the molten wax 8 in the wax boiler 2.

At the same time, this embodiment offers the possibility of disposing the wax reservoir 14 not above the wax boiler 2, but at any optional location, since the wax does not necessarily need to be transported from the wax reservoir 14 to the wax boiler 2 under the force of gravity.

As shown, the lid 23 of the wax reservoir 14 is formed in this embodiment as a pressure-tight lid by means of gaskets 29 and locks 30.

This pressure-tight lid has an inlet 31 connected via a line 32 to a pressure source 33. The inlet 31 can also be provided at any other optional location of the wax reservoir 14. In any case, the pressure at the inlet 31 is greater than the pressure in the wax boiler 2, so that the wax boiler 2 can be replenished without the force of gravity and against the pressure in the wax boiler 2.

In the embodiment shown in FIG. 2, the wax reservoir 14 and the wax boiler 2 are connected to a common pressure source 33, regulating devices 34 being provided in the pressure line 12 leading to the pressure inlet 11 of the wax boiler 2, so that the difference in pressure necessary for transporting the wax from the wax reservoir 14 to the wax boiler 2 can be adjusted.

As is also indicated by way of a sketch in FIG. 2, it is possible in this embodiment to secure automatic functioning by providing a level sensor 35 to detect the level of the molten wax 8 in the wax boiler 2 and to actuate the shut-off valve 17 accordingly.

In the embodiment illustrated, limit switches 36, 37 are provided, corresponding to the minimum and maximum levels and connected via control lines 38 and 39 to an operating element 40 of the shut-off valve 17 equipped with a motor, said control lines 38 and 39 controlling said operating element 40 as operated by the level sensor 35 to open or close said shut-off valve 17 so that in this way the supply of molten wax 8 in the wax boiler 2 can be topped up as necessary.

All the features and advantages of the invention as illustrated in the description, the Claims and the drawings, including details of design and spatial dispositions, can be essential to the invention, both alone and in any combination.

LIST OF REFERENCE NUMBERS

1 = device
2 = wax boiler
3 = heating device of 2
4 = wax-injection nozzle
5 = lid of 2
6 = gaskets
7 = lock of 5
8 = wax in 2
9 = housing of 2
10 = floor plate of 9
11 = pressure inlet
12 = pressure line
13 = deaeration valve
14 = wax reservoir
15 = wax-replenishing channel
16 = heating device of 14
17 = shut-off valve
18 = heating lagging
19 = thermostat
20 = mains switch
21 = housing of 14
22 = heat insulation of 20
23 = lid of 14
24 = handle
25 = pipe socket
26 = outlet
27 = heat insulation of 24
28 = depression
29 = gasket of 24
30 = lock of 24
31 = inlet
32 = line
33 = pressure source
34 = regulating device
35 = level sensor
36 = limit switch
37 = limit switch
38 = control line
39 = control line
40 = operating element of 17

I claim:

1. Device for melting and injecting wax for the manufacture of wax parts in broken-mould casting, comprising a wax boiler having a wax-injection nozzle, said boiler being provided with a heating device for melting the wax and keeping it molten, and having a removable lid to pressure-seal said boiler and a pressure inlet connected to a pressure line (12) which in turn is connected to a pressure source, said lid being provided with a deaeration valve, characterised in that the wax boiler (2) is connected via a wax-replenishing channel (15) to a wax-premelting container defining a reservoir (14)

having a heating device (16), and that the wax-replenishing channel (15) is provided with a shut-off valve (17).

2. Device as claimed in claim 1, characterised in that the heating device (16) of the wax reservoir (14) is formed as electric heating lagging (18), and that an adjustable thermostat (19) is provided for the heating lagging (18).

3. Device as claimed in either one of claims 1 or 2, characterised in that the wax reservoir (14) is disposed within a housing (21) having heat insulation (22).

4. Device as claimed in claim 1, characterised in that the wax reservoir (14) is sealed with a removable lid (23).

5. Device as claimed in claim 1, characterised in that the wax reservoir (14) is disposed above the wax boiler (2).

6. Device as claimed in claim 1, characterised in that there is an outlet (26) from the wax-replenishing channel (15) leading into the wax boiler (2) and disposed within the lid of the wax boiler (2).

7. Device as claimed in claim 6, characterised in that the wax-replenishing channel (15) is formed in a pipe socket (25), which supports the wax reservoir (14) at a distance above the lid (5) of the wax boiler (2) in such a way that the wax is transported from the wax reservoir (14) to the wax boiler (2) under the force of gravity.

8. Device as claimed in claim 7, characterised in that the pipe socket (25) has heat insulation (27).

9. Device as claimed in either one of claims 7 or 8, characterised in that the pipe socket (25) leads out of a funnel-shaped depression (28) in the bottom of the wax reservoir (14).

10. Device as claimed in claim 9, characterised in that the wax reservoir (14) is formed as a detachable unit that is mounted on the wax boiler (2), the pipe socket (25) being firmly connected to the lid (5) of the wax boiler (2) and forming the support of the wax reservoir (14).

11. Device as claimed in claim 9, characterised in that the wax boiler (2) and the wax reservoir (14) are contained in a common housing.

12. Device as claimed in claim 1, characterised in that the lid (23) of the wax reservoir (14) is formed as a pressure-tight lid and that the wax reservoir (14) has an inlet (31) connected to a pressure source (33), the pressure at the inlet (31) being greater than the pressure in the wax boiler (2).

13. Device as claimed in claim 12, characterised in that the wax reservoir (14) and the wax boiler (2) are connected to a common pressure source (33) and that means for regulating (34) is provided in the pressure line (12) leading to the wax boiler (2), for adjusting the difference in pressure between the wax reservoir (14) and the wax boiler (2).

14. Device as claimed in either one of claims 12 or 13, characterised in that a level sensor (35) is provided in the wax boiler (2) to detect the level of the wax (8), and that said level sensor (35) includes means for controlling the shut-off valve (17).

15. Device as claimed in claim 14, characterised in that said means for controlling comprises limit switches (36, 37) corresponding to minimum and maximum levels of said was and connected to an operating element (40) of the shut-off valve (17).

* * * * *

UNITED STATES PATENT AND TRADEMARK OFFICE
CERTIFICATE OF CORRECTION

PATENT NO. : 5,123,569
DATED : June 23, 1992
INVENTOR(S) : LINDNER

It is certified that error appears in the above-identified patent and that said Letters Patent is hereby corrected as shown below:

Col. 1, line 52, change "5 1" to --5 l-- (use letter --l-- instead of the numeral "1");

Col. 6, line 68, after "a", second occurrences, insert --wax--;

Col. 8, line 31, change "was" to --wax--.

Signed and Sealed this

Twenty-third Day of November, 1993

Attest:

BRUCE LEHMAN

Attesting Officer

Commissioner of Patents and Trademarks